United States Patent
Dave et al.

(10) Patent No.: US 11,663,775 B2
(45) Date of Patent: May 30, 2023

(54) GENERATING PHYSICALLY-BASED MATERIAL MAPS

(71) Applicant: ADOBE INC., San Jose, CA (US)

(72) Inventors: Akshat Dave, Houston, TX (US); Kalyan Krishna Sunkavalli, San Jose, CA (US); Yannick Hold-Geoffroy, San Jose, CA (US); Milos Hasan, Oakland, CA (US)

(73) Assignee: Adobe, Inc., San Jose, CA (US)

( * ) Notice: Subject to any disclaimer, the term of this patent is extended or adjusted under 35 U.S.C. 154(b) by 74 days.

(21) Appl. No.: 17/233,861

(22) Filed: Apr. 19, 2021

(65) Prior Publication Data

US 2022/0335682 A1    Oct. 20, 2022

(51) Int. Cl.
*G06T 15/50* (2011.01)
*G06T 15/00* (2011.01)
*G06N 3/08* (2023.01)
*G06T 15/04* (2011.01)

(52) U.S. Cl.
CPC .............. *G06T 15/506* (2013.01); *G06N 3/08* (2013.01); *G06T 15/005* (2013.01); *G06T 15/04* (2013.01)

(58) Field of Classification Search
CPC ..... G06T 15/506; G06T 15/005; G06T 15/04; G06N 3/08
See application file for complete search history.

(56) References Cited

U.S. PATENT DOCUMENTS

| | | | |
|---|---|---|---|
| 11,308,669 B1* | 4/2022 | Nguyen | G06T 11/60 |
| 11,410,378 B1* | 8/2022 | Ghosh | G06T 15/506 |
| 11,436,791 B2* | 9/2022 | Albert | G06V 10/757 |
| 2008/0186390 A1* | 8/2008 | Sato | G06T 3/4053 348/222.1 |
| 2012/0280973 A1* | 11/2012 | Nagy | G06T 15/04 345/419 |
| 2016/0261850 A1* | 9/2016 | Debevec | G06V 40/16 |
| 2018/0238800 A1* | 8/2018 | Lecocq | G01N 21/57 |

(Continued)

OTHER PUBLICATIONS

Goldman et al., "Shape and Spatially-Varying BRDFs from Photometric Stereo", 2010 (Year: 2010).*

(Continued)

*Primary Examiner* — Phong X Nguyen
(74) *Attorney, Agent, or Firm* — Shook, Hardy & Bacon L.L.P.

(57) ABSTRACT

Methods, system, and computer storage media are provided for generating physical-based materials for rendering digital objects with an appearance of a real-world material. Images depicted the real-world material, including diffuse component images and specular component images, are captured using different lighting patterns, which may include area lights. From the captured images, approximations of one or more material maps are determined using a photometric stereo technique. Based on the approximations and the captured images, a neural network system generates a set of material maps, such as a diffuse albedo material map, a normal material map, a specular albedo material map, and a roughness material map. The material maps from the neural network may be optimized based on a comparison of the input images of the real-world material and images rendered from the material maps.

20 Claims, 7 Drawing Sheets

(56) References Cited

U.S. PATENT DOCUMENTS

| | | | | |
|---|---|---|---|---|
| 2019/0347526 | A1* | 11/2019 | Sunkavalli | G06N 3/084 |
| 2020/0151940 | A1* | 5/2020 | Yu | G06T 15/04 |
| 2021/0201075 | A1* | 7/2021 | Pahde | G06N 3/0454 |
| 2021/0295592 | A1* | 9/2021 | von Cramon | G06N 3/08 |
| 2021/0358197 | A1* | 11/2021 | Shysheya | G06T 15/04 |
| 2022/0051485 | A1* | 2/2022 | Martin Brualla | G06T 15/506 |
| 2022/0083795 | A1* | 3/2022 | Zhang | G06V 20/64 |
| 2022/0108422 | A1* | 4/2022 | Choi | G06T 17/00 |
| 2022/0108517 | A1* | 4/2022 | Wang | G06V 40/169 |
| 2022/0116531 | A1* | 4/2022 | Georgis | H04R 1/406 |
| 2022/0189095 | A1* | 6/2022 | Hauswiesner | G06T 7/11 |
| 2022/0215266 | A1* | 7/2022 | Venkataraman | G06N 3/088 |
| 2022/0270321 | A1* | 8/2022 | Ghosh | G06T 7/90 |
| 2022/0307227 | A1* | 9/2022 | Pfaff | B62D 33/06 |
| 2022/0335682 | A1* | 10/2022 | Dave | G06T 15/005 |
| 2022/0392141 | A1* | 12/2022 | Fu | G06T 3/0006 |

OTHER PUBLICATIONS

Learning to Reconstruct Shape and Spatially-Varying Reflectance from a Single Image, Li et al., 2018 (Year: 2018).*

Yu Guo et al; MaterialGAN: Reflectance Capture using a Generative SVBRDF Model; Yu Guo et al.; ACM Trans. Graph vol. 39, No. 6 Article 254; Dec. 2020; 13 Pages; University of California, Irvine CA, USA; https://arxiv.org/abs/2010.00114.

Guanying Chen et al: PS-FCN: A Flexible Learning Framework for Photometric Stereo; Guanying Chen; The University of Hong Kong; University of Oxford; China; Jul. 23, 2018; 16 Pages; https://arxiv.org/abs/1807.08696.

Valentin Deschaintre; Flexible SVBRDF Capture with a Multi-Image Deep Network; Universite Cote d Azur, Inria; Jun. 27, 2019; 14 Pages; France; https://arxiv.org/abs/1906.11557.

* cited by examiner

GENERATING PHYSICALLY-BASED MATERIAL MAPS

BACKGROUND

Digitizing real-world materials is useful for many applications, including video game development, computer-generated imagery, augmented reality, scene understanding, and advertisements. Using captured physical materials to create digital materials allows the appearance of the real-world objects to be applied to virtual objects. Some existing technologies for creating physically-based digital materials utilize metrology instruments, such as goniophotometers, that have a lighting apparatus that rotates along an axis to capture the images of a real-world material sample at a broad range of angles. These instruments are typically bulky, expensive, and involve slow operation to capture images. Further, the number of captures acquired by these instruments require a large amount of computer processing power to covert the captures into digital material maps. Other solutions include using a handheld camera, such as a cellphone camera, with a flashlight pointed at the material sample from a limited number of directions. These solutions, however, typically provide poor accuracy or low-quality results. As such, existing technologies lack the ability to create accurate, high-quality digital materials without requiring such a high number of image captures that would make image capturing and processing burdensome in terms of cost, space, and computer processing power.

SUMMARY

Embodiments of the present disclosure are directed towards systems, methods, and computer storage media for creating digital material in the form of physically-based material maps from captures of real-world materials. Images capturing a real-world material with different lighting patterns, which may include one or more area lights, are utilized to generate the material maps. The input images may include sets of images captured using a filter on the camera lens. For instance, a diffuse component image and a specular component image may be obtained for each lighting pattern by rotating a polarization filter when capturing images of the material.

One or more material map approximations, such as a diffuse albedo material map approximation and a normal material map approximation, may be determined from the input images. These material map approximations may be determined utilizing a photometric stereo technique. The input images and material map approximations may be utilized to generate a set of material maps from a neural network system. In example embodiments, the neural network system includes multiple neural networks that are each trained to generate a particular type of material map, such as a diffuse albedo material map, a normal material map, a specular albedo material map, and a roughness material map. Further embodiments of the present disclosure include optimizing the material maps based on a comparison of the input images and images rendered from the maps output by the neural network system. Optimization may be performed utilizing a differentiable renderer and may be repeated until a threshold maximum difference between the input images and rendered images is met.

This Summary is provided to introduce a selection of concepts in a simplified form that are further described below in the Detailed Description. This Summary is not intended to identify key features or essential features of the claimed object matter, nor is it intended to be used as an aid in determining the scope of the claimed object matter.

DETAILED DESCRIPTION

Figure 1:
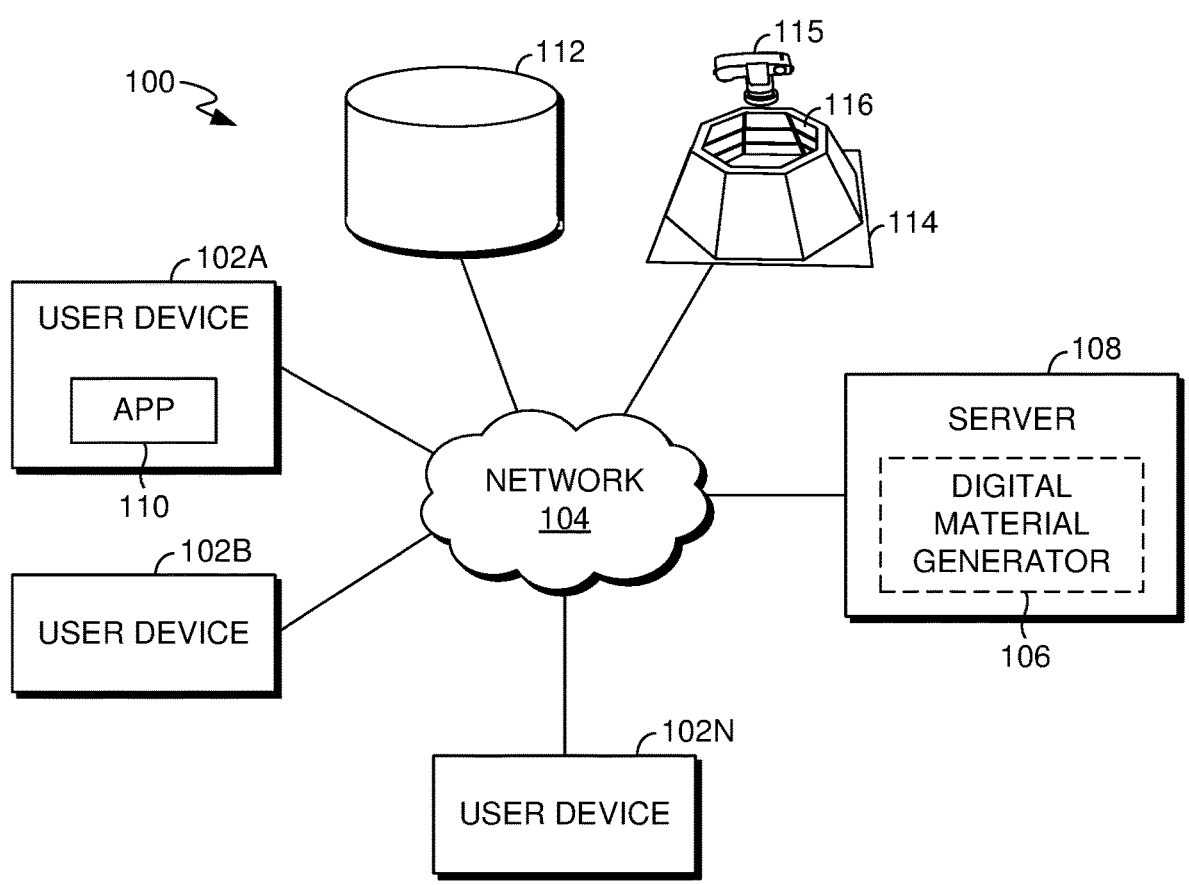
FIG. 1 depicts an example configuration of an operating environment in which implementations of the present disclosure can be employed.

The object matter of the present invention is described with specificity herein to meet statutory requirements. However, the description itself is not intended to limit the scope of this patent. Rather, the inventors have contemplated that the claimed object matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present disclosure are directed towards technologies for enabling physically-based rendering of digital objects by accurately digitizing real-world materials. Digitizing real-world materials is useful for many applications, including video game development, computer-generated imagery, augmented reality, scene understanding, and advertisements. Using captures of physical materials to create digital materials allows the appearance of the real-world materials to be applied to virtual objects. However, accurately estimating material properties from those captures can be technically challenging. To increase accuracy by capturing more material information, some conventional technologies utilize metrology instruments, such as goniophotometers, that have a lighting apparatus that rotates along an axis to capture a high quantity of images of a real-world material at a broad range of angles. However, the number of images acquired by these instruments require a large amount of computer processing power to covert the images into digital material maps. Further, these instruments are typically bulky, expensive, and involve a slow process to capture images. On the other end of the spectrum, some solutions include using a handheld camera, such as a cellphone camera, with a flashlight aimed at the material sample from a limited number of directions. These solutions, however, typically provide poor accuracy and low-quality results. In this way, existing technologies present technical challenges to create accurate and high-quality physically-based renderings without negatively impacting computing resource consumption, including processing power and memory, and require expensive and bulky equipment.

At a high-level, embodiments of the present disclosure provide solutions to these challenges by enabling accurate synthesis of material maps based on a limited number of images capturing a real-world material. Those material maps may be used to generate visual renderings of the material depicted in the original image. An "image" as described herein is a visual representation of one or more portions of the real world or a visual representation of one or more documents. For example, an image can be a digital photograph, a digital image among a sequence of video segments, a graphic image file (e.g., JPEG, PNG, etc.), a picture (or sub-element of a picture), and/or a bitmap among other things. A "visual rendering" as described herein refers to another image (e.g., in 2D or 3D) (e.g., an "output image"), a physically-based rendering (PBR) material, a SVBRDF PBR material, an animation, and/or other suitable media, content, or computer object. "Material maps" (e.g., diffuse albedo map, specular albedo map, normal map, roughness map) as described herein are a set of images that encode the reflectance properties of a material (e.g., its color, its geometry, its roughness). Material maps are typically the input to a physically-based rendering or other visual rendering. A "physically based rendering" (PBR) material refers to the properties of a surface that models the flow (e.g., via a set of procedural steps) of light to simulate the real world in a rendering engine. A PBR material represents the behavior of light, shading, shadows, and surfaces of real world objects or materials.

In accordance with embodiments herein, the images utilized to generate the material maps capture the material with different lighting patterns. To maximize the material property information that may be extracted from each image, example embodiments utilize images captured with area lights, which uniformly cast light rays in the 3D environment within a set boundary and may provide, within one capture, more light information compared to a point light or spot light. In some embodiments, for instance, material maps may be generated in accordance with some embodiments of the disclosure utilizing images with three lighting patterns using area lights.

Additionally, in accordance with example aspects of the disclosure, the captured images may be separated into a diffuse component image and a specular component image. This separation may be done by applying and rotating a polarization filter over the lens of the camera when capturing the real-world material. Therefore, rather than having one RGB image with each lighting pattern, embodiments may utilize sets of diffuse and specular component images with each lighting pattern. The diffuse and specular component images may be utilized to generate the material maps to increase the accuracy of the material maps.

Based on the input images, some embodiments approximate one or more material maps. For example, a diffuse albedo material map approximation and a normal material map approximation may be generated from the input images using a photometric stereo technique, such as one utilizing a pseudo-inverse function. These approximations may be input into a neural network, along with the input images, to generate a set of material maps. First determining one or more approximations may help increase accuracy of the material maps generated by the neural network system. In illustrative aspects, the set of material maps generated by the neural network system include a diffuse albedo material map, a normal material map, a specular albedo material map, and a roughness material map. In some embodiments, the number of material map approximations is less than the number of material maps generated with the neural network, which may help limit the computational processing power and time required to generate the material maps.

Further embodiments of the disclosure optimize the material maps based on a comparison of the input images of the real-world material and images rendered from the maps output by the neural network system. Optimization may be performed with a differentiable renderer and may be repeated until a threshold maximum difference between the input images and rendered images is met. This optimization process helps to increase the accuracy of the material maps.

FIG. 1 depicts an example configuration of an environment in which some implementations of the present disclosure can be employed for physically-based material rendering. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that environment 100 shown in FIG. 1 is an example of one suitable operating environment. Among other components not shown, environment 100 includes a number of user devices, such as user devices 102A and 102B through 102N, capture system 114, network 104, database 112, and server(s) 108. Each of the components shown in FIG. 1 may be implemented via any type of computing device, such as one or more of computing device 700 described in connection to FIG. 7, for example. These components may communicate with each other via network 104, which may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within environment 100 within the scope of the present disclosure. Each may comprise a single device or multiple devices cooperating in a distributed environment.

User devices 102A through 102N may be any type of computing device capable of being operated by a user. For example, in some implementations, user devices 102A through 102N are the type of computing device described in relation to FIG. 7. By way of example and not limitation, a user device may be embodied as a personal computer (PC), a laptop computer, a mobile device, a smartphone, a tablet computer, a smart watch, a camera, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device with a built-in camera or capable of being connected to a camera.

User devices 102A through 102N may include one or more processors and one or more computer-storage media. The computer-storage media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

Application 110 may generally be any application capable of facilitating the exchange of information between user devices 102A through 102N and the server(s) 108 in carrying out steps for physically-based material rendering, including digitizing materials and training a neural network to generate material maps. In some implementations, application 110 comprises a web application that can run in a web browser and could be hosted at least partially on the server-side of environment 100. In addition, or instead, application 110 may comprise a dedicated application, such as an application having image processing functionalities, including but not limited to functionalities for 3D design, game development, augmented reality, and/or virtual reality. In one example, application 110 is an application that provides for digital 3D material design, such as Substance Alchemist or Substance Designer by Adobe®. In some cases, application 110 is integrated into the operating system (e.g., as a service). It is, therefore, contemplated herein that "application" be interpreted broadly.

In accordance with embodiments herein, the application 110 is configured to facilitate generating digital materials from images of a real-world material with different lighting patterns. The captures of the material may be selected or input by a user in various manners. For example, a user may take images of a material with different lighting patterns using a capture system, such as capture system 114. As another example, a user may select a desired set of images from a repository, for example, stored in a data store accessible by a network, such as database 112, or stored locally at the user device 102A.

Capture system 114 includes an imaging mechanism, such as a camera, for capturing images of a real-world material sample. In example aspects, capture system 114 further includes a set of lights, each positioned at a different orientation relative to the imaging mechanism. Capture system 114 depicted in FIG. 1, for example, includes a camera 115 that is positioned to provide a top-down view of a material sample and multiple columns (e.g., column 116) of near area lights positioned around a material sample. Each column of lights may include multiple lights at different elevations. For example, capture system 114 includes 24 area lights that are arranged in eight columns of three lights. Different lighting patterns may be used for each capture of a material, showing how the material interacts with light from different directions. In some embodiments, the light pattern is one area light of capture system 114 such that each image is captured when one area light is illuminated. Area lights uniformly cast directional light rays within a set boundary, such as a rectangle or trapezoid as shown in FIG. 1. Area lights may provide, within one capture, more light information compared to a point light or spot light. In this way, embodiments of the disclosure may utilize area lights for images of the real-world material and can digitize the material more efficiently because less captures are required to obtain enough light information for an accurate, high-quality result.

Capture system 114 may be communicatively coupled to user device 102A and/or server 108 via network 104 such that images captured by capture system 114 may be transmitted through the network. Additionally or alternatively, capture system 114 be communicatively coupled to user device 102A and/or server 108 via a cable or may store images on a storage device, such as a device described with respect to computing device 700 of FIG. 7, which can then be read by user device 102A and/or server 108. Further, although capture system 114 is depicted separately, it is understood that capture system 114 may be integrated into any of the user devices, such as user device 102A.

In some embodiments, for each lighting pattern, capture system 114 captures a set of images that each includes a diffuse component image and a specular component image. The diffuse and specular component images may each be captured using a polarization filter applied over the lens of the capture system 114 when the images are being taken. Obtaining the two components may be done by changing the rotational orientation of the polarization angle between the two captures. The polarization filter may be a linear polarization filter. Each set of images may be captured with a unique lighting pattern.

As described herein, embodiments of server 108 may also facilitate generating digital materials. Server 108 includes one or more processors, and one or more computer-storage media. The computer-storage media includes computer-readable instructions executable by the one or more processors. The instructions may optionally implement one or more components of a digital material generator 106, described in additional detail below.

Digital material generator 106 generates material maps for a real-world material based on input images capturing the real-world material under a variety of lighting patterns. These material maps may be utilized to generate a physically-based material rendering by applying the maps to one or more digital objects. At a high level, digital material generator 106 utilizes input images, which may be in the form of sets of specular and diffuse component images, to approximate one or more material maps, such as a diffuse albedo material map approximation and a normal material map approximation. These approximations may be generated utilizing a photometric stereo utilizing a pseudo-inverse function. Digital material generator 106 may then use a neural network to generate a set of material maps based on the approximations and input images. Embodiments of digital material generator 106 may optimize the material maps based on a comparison of the input images to images rendered from the generated material maps. Additionally, some embodiments of digital material generator train the neural network system to generate the material maps.

For cloud-based implementations, the instructions on server 108 may implement one or more components of digital material generator 106, and application 110 may be utilized by a user to interface with the functionality implemented on server(s) 108. In some cases, application 110 comprises a web browser. In other cases, server 108 may not be required. For example, the components of digital material generator 106 may be implemented completely on a user device, such as user device 102A, which may be either physically separate from or integrated with capture system 114. In this case, digital material generator 106 may be embodied at least partially by the instructions corresponding to application 110 and may be provided as an add-on or plug-in to application 110. It should be appreciated that digital material generator 106 may be provided via multiple devices arranged in a distributed environment that collectively provide the functionality described herein. Additionally, other components not shown may also be included within the distributed environment. Furthermore, digital material generator 106 may at least partially be embodied as a cloud computing service.

Environment 100 of FIG. 1 further may include database 112, which may store computer instructions (e.g., software program instructions, routines, or services), data, and/or models used in embodiments described herein. In some implementations, database 112 stores information or data received via the various components of digital material generator 106 and provides the various components with access to that information or data as needed. Although depicted as a single component, database 112 may be embodied as one or more data stores. Further, the information in database 112 may be distributed in any suitable manner across one or more data stores for storage (which may be hosted externally or internally).

Figure 2:
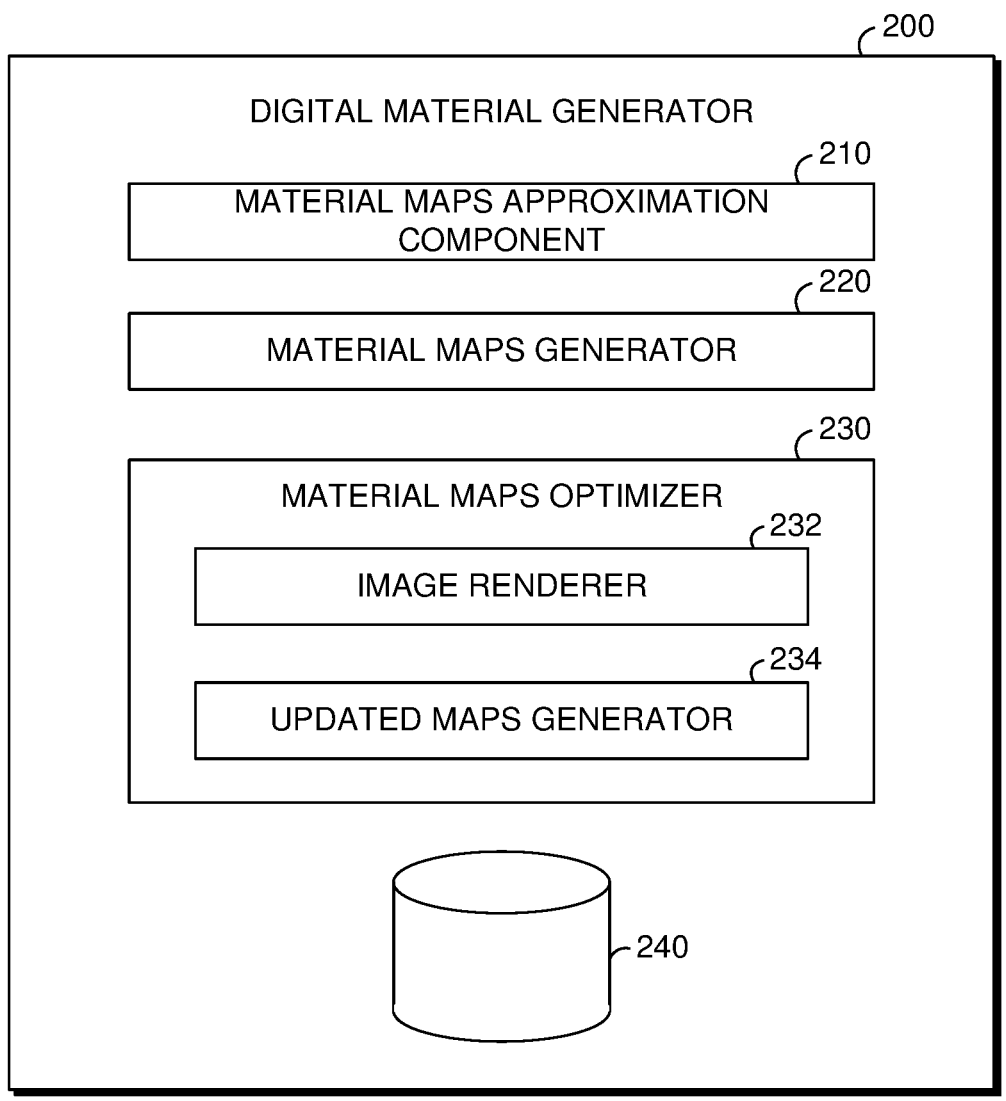
FIG. 2 depicts aspects of an example digital material generator, in accordance with various embodiments of the present disclosure.

Referring to FIG. 2, aspects of an illustrative digital material generator 200 are shown in accordance with various embodiments of the present disclosure. Digital material generator 200 includes a material map approximation component 210, a material maps generator 220, a material maps optimizer 230, and a data store 240. The foregoing components of digital material generator 200 can be implemented, for example, in operating environment 100 of FIG. 1. In particular, those components may be integrated into any suitable combination of user devices 102A and 102B through 102N, and server(s) 208, including as digital material generator 106 of FIG. 1.

Data store 240 is used to store computer instructions (e.g., software program instructions, routines, or services), data, and/or models used in embodiments described herein. In some implementations, data store 240 stores information or data received via the various components of digital material generator 200 and provides the various components with access to that information or data, as needed. Although depicted as a single component, data store 240 may be embodied as one or more data stores. Further, the information in data store 240 may be distributed in any suitable manner across one or more data stores for storage (which may be hosted externally). Data store 240 may store images of a real-word material (including diffuse component images and specular component images), such as images captured by capture system 114 of FIG. 1, that may be used to digitize the real-world material. In some cases, data can be received by digital material generator 200 from user devices (e.g., an input image received by either user device 102A, via, application 110 or capture system 114). In other cases, data can be received from one or more data stores in the cloud.

Embodiments of data store 240 may further store digital maps synthesized by components of digital material generator 200. Such digital materials may be stored as material maps and/or as models rendered with a generated material. In some embodiments, data store 240 stores these material models as a visual sample of the digital material, where a user may select a material model from data store 240 to apply the associated material maps a user-selected digital object.

Material map approximation component 210 is generally configured to approximate one or more material maps from input images depicting a real-world material. Example aspects of material map approximation component 210 generates a diffuse albedo material map approximation and a normal material map approximation. The diffuse albedo approximation is a material map with approximate albedo values representing the solid colors, without shadowing, shading, and/or highlights (i.e., without lighting effects), at each pixel. The normal approximation is a material map with approximate normal values representing approximate surface geometry of the object depicted in the captured images. In some embodiments, the normal approximation is saved in a Red-Green-Blue (RGB) format where each pixel value represents a 3D vector indicating the direction in which the surface normal is pointing.

In example embodiments, material map approximation component 210 performs a photometric stereo technique to generate the approximation from the diffuse component images and the specular component images. In some embodiments, the photometric stereo technique utilizes a pseudo-inverse function (also referred to as Moore-Penrose pseudoinverse). For example, a photometric stereo may be performed by using a pseudo-inverse function and solving for the albedo and normal vectors. In some embodiments, material map approximation component 210 computes, for each pixel (i) within each image or set of images (I), lighting vectors for each sampled point (k) on an area light (j) utilized for the particular set of captures. For each pixel, a lighting matrix and captured intensity are determined based on vectors for all lights and are used to perform a pseudo-inverse, which then may be used to obtain surface normal and diffuse albedo values.

For instance, an example process for obtaining the normal approximations and diffuse albedo approximations may include computing lighting vectors with the following:

$$l(k, i) = \frac{x(k) - x(i)}{\|x(k) - x(i)\|^3}$$

where x is the 3D coordinate and $\|x(k)-x(i)\|$ is L-2 norm. The lighting vectors over all points k in area light j may be summed as shown below:

$$l'(j,i) = \Sigma_k l(k,i)$$

For all area lights j, a lighting matrix (L(i)) may be generated, and captured intensity (I(i)) at pixel (i) is stacked column wise for all area lights (j), as shown below:

$$L(i) = \begin{bmatrix} l'(1, i) \\ \vdots \\ l'(j, i) \end{bmatrix}$$

$$I(i) = [I(1, i) \ \ldots \ I(j, i)]$$

Pseudo-inverse at pixel (i) may be performed using the lighting matrix and stacked intensity. From the pseudo-inverse (n'(i)), an approximate diffuse albedo value (p(i)) and an approximate surface normal value (n(i)) may be obtained for each pixel, as shown below:

$$n'(i) = L^+, I(i)$$

$$\rho(i) = \|n'(i)\|$$

$$n(i) = \frac{n'(i)}{\rho(i)}$$

Material maps generator 220 is generally configured to utilize one or more machine learning models to generate a set of material maps for the real-world material captured in the sets of images. The machine learning model(s) used by material maps generator 220 (or any machine learning model described herein) may be or include any suitable type of model, such as a classifier, clustering model, regression model, or any deep learning (e.g., multiple-layered neural network) model. Examples include Convolutional Neural Networks (CNN), Recurrent Neural Networks (RNN), Boltzmann machines, Autoencoders, K-means clustering model, Siamese Neural Network (SNN), Random Forest, and the like. In example embodiments, material maps generator 220 uses a deep neural network system to predict the material maps as described below. The machine learning model(s) may be trained as described with respect to FIG. 4.

Material maps generator 220 inputs, into the one or more machine learning models, the sets of specular and diffuse component images captured for a real-world material as well as the approximate maps (e.g., a diffuse albedo material map approximation and a normal material map approximation) generated by material map approximation component 210. Each set of material maps generated for a particular material may include a diffuse albedo material map, a normal material map, a specular albedo material map, and a roughness material map. In example aspects, material maps generator 220 utilizes a deep neural network system that includes multiple neural networks (e.g., U-Nets), where each neural network outputs a different type of material map. For instance, the material maps generator 220 may utilize four neural networks: (i) a diffuse albedo neural network trained to generate a diffuse albedo material map, (ii) a normal neural network trained to generate a normal material map, (iii) a specular albedo neural network trained to generate a specular albedo material map, and (iv) a roughness neural network trained to generate a roughness material map. Each neural network may be a fully convolutional neural network, such as a U-Net.

The diffuse albedo material map generated by material maps generator 220 indicates the solid colors of the material, without shadowing, shading, and/or highlights (i.e., without lighting effects), at each pixel. Further, the normal material map represents the surface geometry of the material depicted in the captured images. In some embodiments, the normal material map approximation is saved in a Red-Green-Blue (RGB) format where each pixel value represents a 3D vector indicating the direction in which the surface normal is pointing. While representing the same type of information, the diffuse albedo material map and normal material map generated by material maps generator 220 may be more precise and accurate than the diffuse albedo and normal material map approximations generated using a photometric stereo technique. The roughness material map indicates how much light is scatted across a surface of the captured material, and the specular albedo material map indicates a degree of reflectiveness of the surface of the captured material at each pixel.

Some embodiments of material maps generator 220 input lighting information into the neural network system with the input images and approximate maps. This lighting information corresponds to the input images as it indicates lighting pattern used for each input image. In some embodiments, this lighting information is in the form of an irradiance map that simulates a particular lighting pattern for white paper (rather than the particular real-world material). An irradiance map may be generated by rendering a purely diffuse and uniformly flat white material using a renderer. The renderer may be an embodiment of image renderer 232 discussed further below. When digital material generator 200 digitizes multiple real-world materials under the same lighting patterns, irradiance maps for the lighting patterns may be created only once and used with input images of different materials.

Embodiments of digital material generator 200 further include material maps optimizer 230 as depicted in FIG. 2. Material maps optimizer 230 is generally configured to generate optimized or updated material maps for the real-world material based on the maps generated by material maps generator 220. Material maps optimizer 230 includes an image renderer 232 and an updated maps generator 234. Material maps optimizer 230 may be a differentiable renderer.

Image renderer 232 is configured to render images of the digital material from material maps output from material maps generator 220. Image renderer 232 renders the images by adding lighting to the material maps. The lighting of the rendered images is intended to simulate the lighting used in the input images capturing the real-world material. As such, image renderer 232 may receive lighting and camera information corresponding to the lighting and camera configurations used to capture the images. The lighting information may indicate where lighting was positioned relative to the real-world material sample, the size of the lights, and/or the type of lights. The camera information may indicate where the camera was positioned, the type of camera and/or images being captured, a resolution of the images, a type of filter used with the camera, and/or rotational position of a filter used with the camera. From one set of material maps, image renderer 232 renders the same number of images as the input images. For example, in aspects in which 24 diffuse component images and 24 corresponding specular component images of a real-world material are captured, image renderer 232 may render 24 diffuse component images and 24 specular component images.

After image renderer 232 generates the rendered images, updated maps generator 234 creates new material maps based on a comparison of the rendered images and the input images capturing the real-world material. This comparison indicates errors that may have resulted from any inaccuracies in the material maps initially generated by the material maps generator 220. Where there is a difference between the rendered images from the image renderer 232 and the input images, the updated maps generator 234 modifies the material maps based on the identified differences in order to reduce the differences.

Material maps optimizer 230 may utilize a differentiable renderer to render the images and update the maps. For example, image renderer 232 may create the rendered images in a forward pass through the differentiable renderer and updated maps generator 234 may create updated, optimized material maps by passing the rendered images back through the differentiable renderer. The material maps and rendered images may be passed through the differentiable renderer back and forth multiple times, each times reducing the differences between the rendered images and the input images. The material maps and rendered images may be passed through the differentiable renderer until a threshold maximum difference between the rendered images and captured images is reached. In some embodiments, the threshold maximum difference is zero, but it is contemplated that the threshold may be greater to allow for some differences. In other aspects, the material maps and rendered images may be passed through the differentiable renderer until either a threshold difference is achieved or a threshold number of passes has occurred, whichever occurs first. In one example, material maps optimizer 230 utilizes a differentiable renderer that utilizes Monte Carlo ray tracing.

The set of material maps (either the set initially generated by material maps generator 220 or the set of updated material maps generated by material maps optimizer 230) may represent the digital material corresponding to the real-world material captured in the images. The material maps may be utilized to create a visual rendering of an object or model with the digital material. The visual rendering may include applying the material maps to a 3D shape, such as a sphere. In some embodiments, sets of material maps generated for a number of materials may automatically be applied to the same shape, such as a sphere, to render samples visually representing the digital material for a gallery or data store of digital materials. Additionally or alternatively, rendering may include applying a selected set of material maps to a digital object selected, input, or created by the user. In this way, a user may select a material specifically for applying to a particular object.

Figure 3:
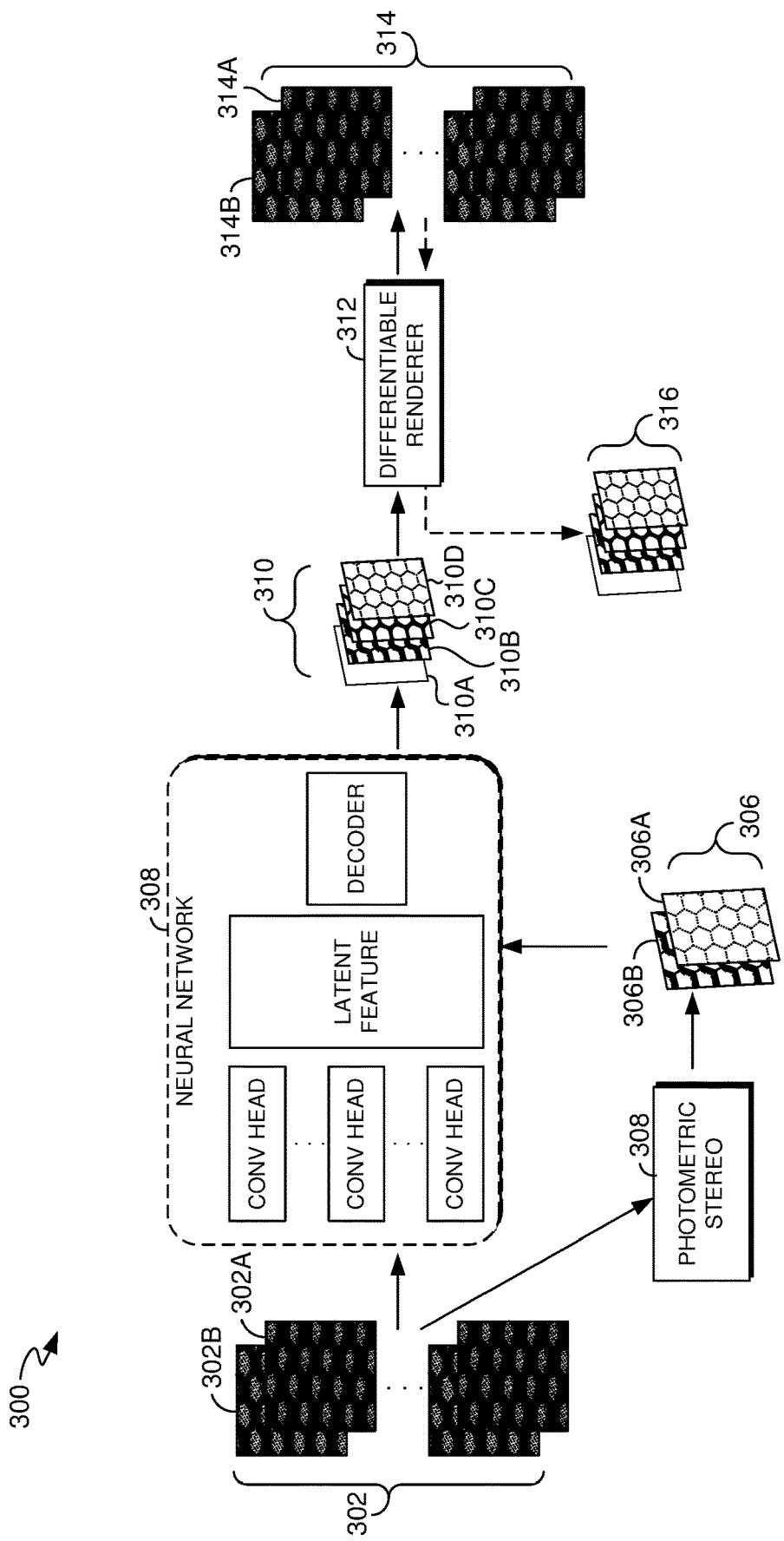
FIG. 3 depicts an example pipeline for generating physically-based digital materials, in accordance with various embodiments of the present disclosure.

FIG. 3 depicts an example pipeline 300 for generating digital materials in accordance with embodiments of the disclosure. Pipeline 300 may be performed by an embodiment of digital material generator 200 of FIG. 2. Input images 302 capturing a real-world material with different lighting patterns are used to generate a digital material. In example embodiments, input images 302 include sets of images made up of a diffuse component image (e.g., 302A) and a specular component image (302B). Further, each input image or set of input component images may correspond to a unique lighting pattern. The number of lighting patterns used to capture a given real-world material may be at least one such that the number of input images or sets of component images may be at least one. In some aspects, the number of lighting patterns used is at least three. In one example, there are 24 sets of component images 302, each set including a diffuse component image and a specular component image.

From input images 302, one or more material map approximations 306 are determined by performing a photometric stereo technique 304. For example, a diffuse albedo material map approximation 306A and a normal material map approximation 306B may be generated from input images 302. Photometric stereo technique 304 may include, at each pixel within the input images 302, computing, lighting vectors for a number of randomly sampled points on the area light(s) utilized for a given image or set of component images. For each pixel, a lighting matrix and a stacked captured intensity are determined using vectors for all lights and used to determine a pseudo-inverse, which then may be used to obtain normal values and diffuse albedo values for each pixel. Photometric stereo technique 304 in pipeline 300 may be performed by an embodiment of material map approximation component 210 of FIG. 2.

The material map approximations 306 as well as the input images 302 are then input into neural network system 308. Neural network system 308 generates a set of material maps 310 based on the material map approximations 306 and the input images 302. In some embodiments, lighting information, such as irradiance maps discussed above with respect to material maps generator 220, are also input into neural network system 308.

In some embodiments, neural network system 308 includes multiple neural networks that each output a different type of material map. For example, neural network system 308 may include four neural networks to generate a set of four material maps, including a specular albedo material map 310A, a diffuse albedo material map 310B, a roughness material map 310C, and a normal material map 310D. As such, neural network system 308 may include a specular albedo neural network to predict specular albedo values for each pixel, a diffuse albedo neural network to predict diffuse albedo values for each pixel, a roughness neural network to predict roughness values for each pixel, and a normal albedo neural network to predict normal values for each pixel.

Embodiments of neural network system 308 may include any suitable type of neural network architectures including but not limited to CNN, RNN, and SNN. For example, neural network system 308 may utilize a U-Net architecture. FIG. 3 depicts an example neural network architecture. In this example, neural network system 308 includes multiple encoders and convolutional layers (depicted as "cony head" in FIG. 3). Further, neural network system 308 includes at least one decoder to reconstruct the latent data into the material maps 310. For simplicity, only one neural network is depicted in FIG. 3, but it should be understood that, in embodiments in which neural network system 308 include multiple neural networks, each network may have the architecture depicted in FIG. 3.

The set of material maps 310 generated by neural network system 308 are optimized using differentiable renderer 312, which may be an embodiment of material maps optimizer 230 in FIG. 2. Differentiable renderer 312 renders images 314 from the material maps 310. Rendered images 314 are the same type as input images 302. For instance, input images 302 may be sets of images that each include a diffuse component image 302A and a specular component image 302B, and rendered images 314 may be sets of images that each include a rendered diffuse component image 314A and a rendered specular component image 314B.

Differentiable renderer 312 creates rendered images 314 by simulating lighting used to capture the real-world material in the input images 302. Therefore, differentiable renderer 312 may render rendered images 314 based on lighting and/or camera information corresponding to the lighting and camera configuration used to capture input images 302. The lighting information may indicate where lighting was positioned relative to the real-world material sample, the size of the lights, and/or the type of lights. The camera information may indicate where the camera was positioned, the type of camera and/or images being captured, a resolution of the images, a type of filter used with the camera, and/or rotational position of a filter used with the camera. Rendered images 314 include the same number of images as the input images 302. For example, in aspects in which the input images comprise 24 sets of diffuse component images and corresponding specular component images, image renderer 232 may render 24 sets of rendered diffuse component images and rendered specular component images from the material maps 310.

Because rendered images 314 are created from material maps 310 and based on the lighting and camera configuration of input images 302, rendered images 314 indicate an accuracy of material maps 310. As such, rendered images 314 are compared to input images 302. Differences between input images 302 and rendered images 314 are indicative of errors in the material maps 310. As such, based on the comparison, rendered images 314 may be passed back through differentiable renderer 312 to create updated material maps 316. In some aspects, updated material maps 316 are then passed through differentiable renderer 312 to render images that are compared to input images 302 in a similar manner as initial material maps 310. If there are any differences, updated material maps 316 may further be refined to reduce the differences. This process may be repeated until a threshold maximum difference between the rendered images and input images 302 is reached. In some embodiments, the threshold maximum difference is zero, but it is contemplated that the threshold may be greater to allow for some differences. In other aspects, the material maps and rendered images may be passed back and forth through the differentiable renderer 312 until either a threshold difference is achieved or a threshold number of passes has occurred, whichever occurs first. The final set of material maps (e.g., updated material maps 316) may be utilized to create a visual rendering of an object so that the object appears to have the material captured in input images 302.

Figure 4:
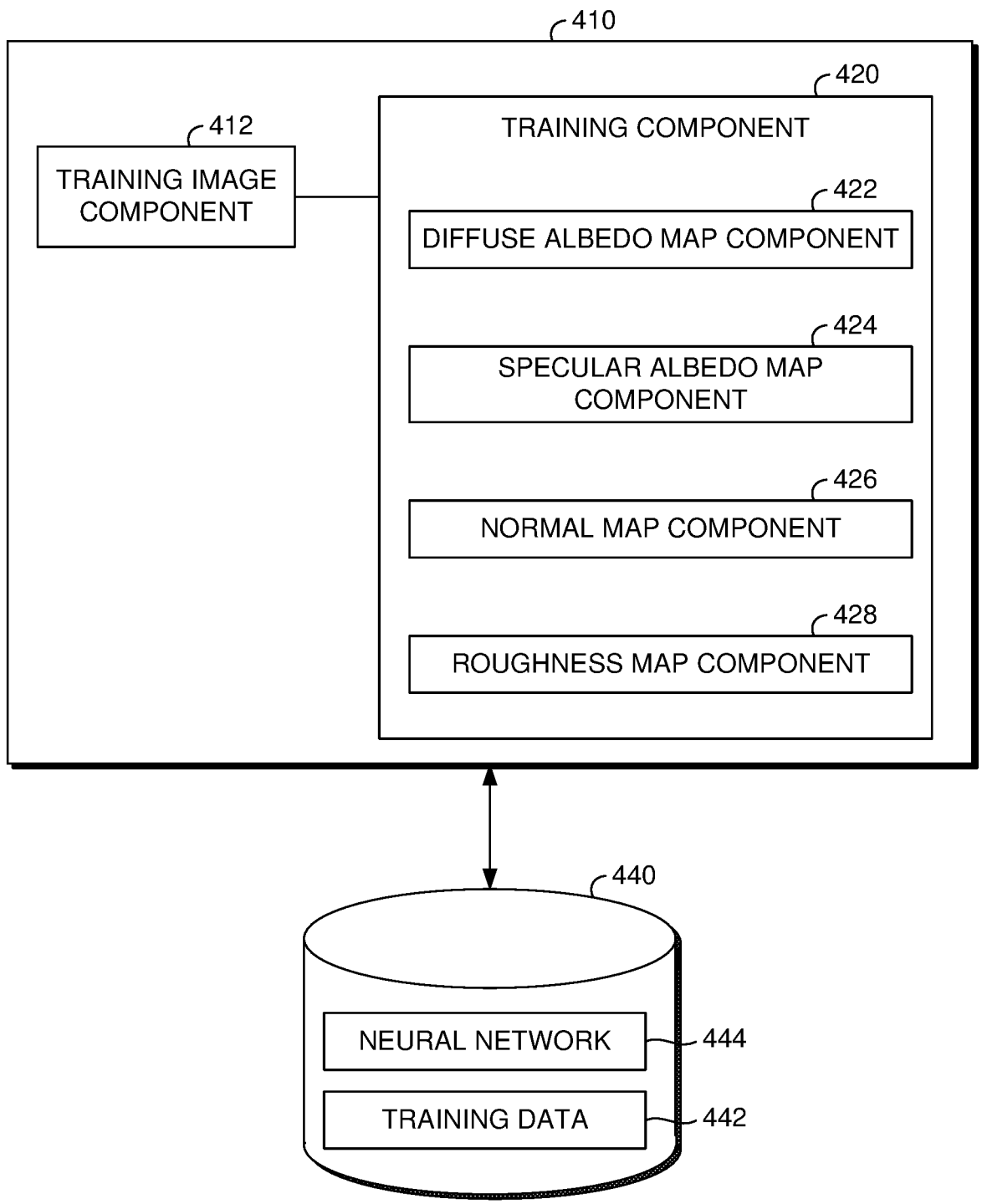
FIG. 4 depicts an example embodiment for training a digital material generator, in accordance with various embodiments of the present disclosure.

FIG. 4 depicts a training engine 410 that may be utilized to train a neural network system, such as neural network system 308 in FIG. 3, to predict material maps for a real-world material captured in input images. Training engine 410 includes a training image component 412 and a training component 420. Although these components are illustrated separately, it can be appreciated that the functionality described in association therewith can be performed by any number of components.

Training image component 412 provides training images that are to be fed into a neural network system, such as neural network system 444, which may be an embodiment of neural network system 308 in FIG. 3, while training neural network system 444. The training input images comprise different images of a real-world material using unique lighting patterns. In some aspects, each lighting pattern includes one or more area lights. Additionally, training input images may comprise sets of component images, with each component image in a set having the same lighting pattern. Each set may include a diffuse component image and a specular component image. In some embodiments, the number of sets of component images for a particular material is within a range of 2 and 50. For instance, training input images may include 24 sets of diffuse component images and specular component images.

Training input images for a given material may correspond to training material maps for the same material. The training material maps serve as ground truth data during training neural network system 444 as described further below. Training input images and training material maps may be stored as training data 442 in a data store 440, which may be an embodiment of data store 240 in FIG. 2.

In various embodiments, training data 442 includes synthetic training data, which may be advantageous to real photographs from which achieving accurate ground truth maps may be difficult. As such, training image component 412 may generate visual renderings from synthetic materials to create training data 442. The synthetic materials used for training may be obtained from the procedural PBR material library Substance Source, which currently contains around 12,000 parametric-stylized materials. Each material file may be in the form of a graph, such as a directed acyclic graph (DAG), that procedurally outputs different channels (e.g., an albedo map, shadow map, highlight map, height map, roughness, metallic, etc.) of a physically-based and spatially-varying material.

From each material graph, parameters of the material graph may be sampled to generate material maps, including a diffuse albedo map, a specular albedo map, a normal map, and a roughness map. Next, a renderer may render images from the training material maps. Rendering images from training material maps may be done based on lighting and/or camera configuration information. The lighting and/or camera configuration information is used to simulate lighting within the rendered images. As such, this information would indicate where hypothetical lighting and a hypothetical camera would be arranged with respect to each other and with respect to a material sample. The renderer used for generating training images may be the same or a similar renderer described with respect to material maps optimizer 230 of FIG. 2. During training, the rendered images may act be used as the training input images, and the material maps from which the images were rendered may act as the ground truth.

As previously described, a neural network, such as neural network system 444, may generate material maps using material map approximations in addition to input images. Embodiments of training image component 412, therefore, may also be responsible for generating material map approximations from training input images. The material map approximations may include a diffuse albedo material map approximation and a normal material map approximation. These approximations may be generated using a photometric stereo technique, such as one utilizing a pseudo-inverse function. An embodiment of material map approximation component 210 in FIG. 2 may be used to generate the approximations. These training map approximations may be stored as training data 442 in data store 440.

Additionally, some embodiments of training data 442 further include lighting information, which may be in the form of an irradiance map that simulates a particular lighting pattern for white paper (rather than the particular real-world material). Training irradiance maps may be generated as described with respect to digital material generator 200 of FIG. 2.

Training component 420 uses training input images, training material map approximations, ground truth data, and, in some embodiments, training irradiance maps to train neural network system 444 to predict material maps. In some aspects, neural network system 444 is made up of multiple neural networks each trained to output a particular type of material map. For example, neural network system 444 may include a diffuse albedo neural network used to generate a diffuse albedo material map, a normal neural network used to generate a normal material map, a specular albedo neural network used to generate a specular albedo material map, and a roughness neural network used to generate a roughness material map. Each neural network may be a fully convolutional neural network, such as a U-Net.

As each neural network has a different output, training component 420 may include subcomponents for training each network. Therefore, embodiments of training component 420 may include a diffuse albedo map component 422 responsible for training a diffuse albedo neural network, a specular albedo map component 424 responsible for training a specular albedo neural network, a normal map component 426 responsible for training a normal neural network, and a roughness map component 428 responsible for training a roughness neural network.

Output of the neural networks are compared to ground truth data, such as a ground truth material maps. Generally, the comparisons to ground truth data indicate errors (or losses), which are used to adjust the neural network system 444 to avoid similar errors in future iterations. For example, diffuse albedo map component 422 may compare a predicted diffuse albedo map with a ground truth diffuse albedo map to determine a loss and make adjustments to the diffuse albedo neural network based on the loss. Specular albedo map component 424, normal map component 426, and roughness map component 428 may similarly compared their respective material maps with corresponding ground truth and adjust the appropriate neural network based on the loss.

Diffuse albedo map component 422, specular albedo map component 424, normal map component 426, and roughness map component 428 may utilize the same type of loss. In some aspects, L1 loss is used. L1 loss is the absolute difference between the generated output $f(x_i)$ and the target $y_i$ summed over all pixels. For example, the following represents L1 loss:

$$S = \sum_{i=1}^{n} |y_i - f(x_i)|$$

Other types of losses, such as L2, may be utilized in other embodiments. In some aspects, different types of losses may be used some for different networks.

Figure 5:
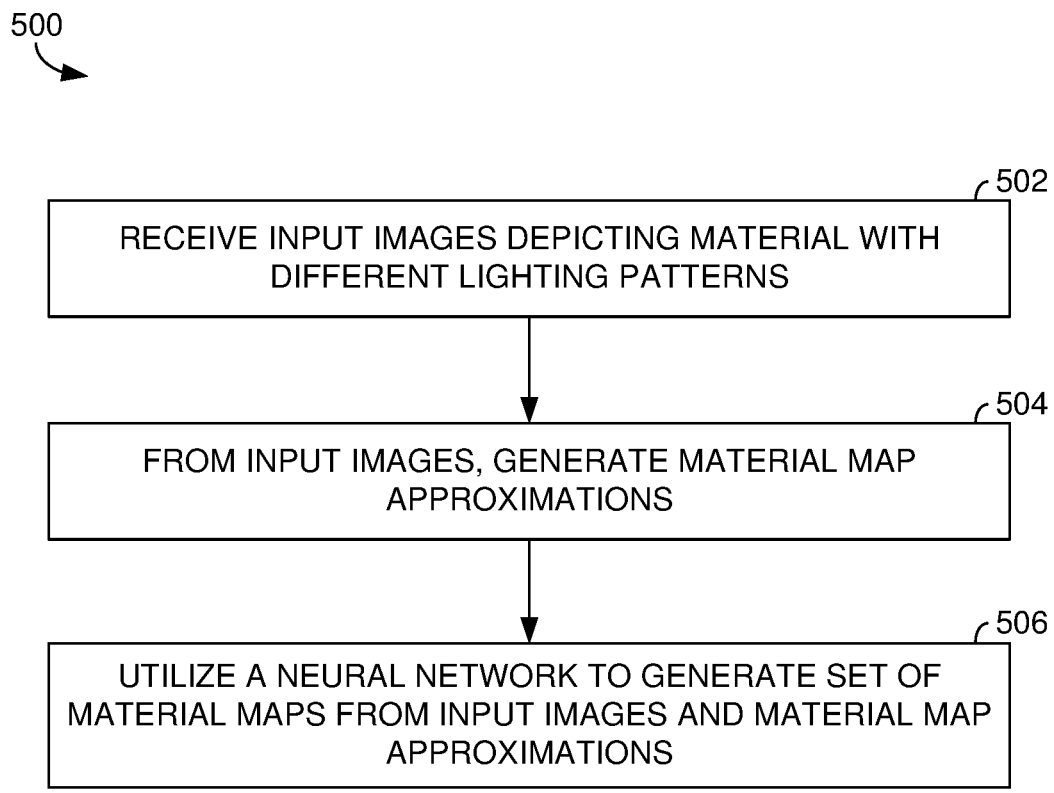
FIGS. 5 and 6 depict example methods for generating a physically-based digital material, in accordance with embodiments of the present disclosure.
Figure 6:
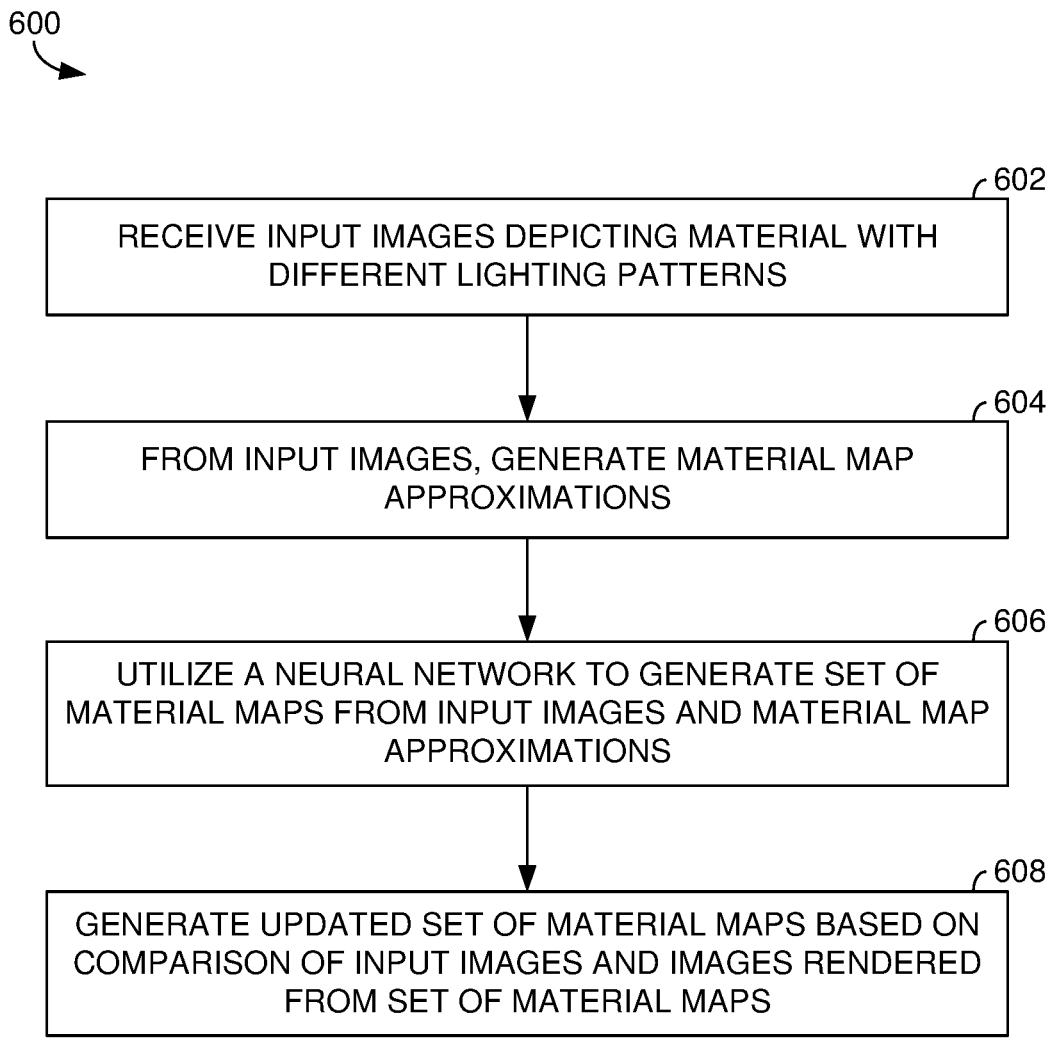

With reference to FIGS. 5 and 6, flow diagrams are provided to show example methods 500 and 600 for generating material maps for a real-world material in accordance with embodiments of the disclosure. Methods 500 and 600 may each be performed, for example, by digital material generator 200 in FIG. 2. Further, embodiments of methods 500 and 600 may be performed in accordance with pipeline 300 of FIG. 3. Methods 500, 600, and any other methods disclosed herein each include steps that correspond to different functions performed by the same or different hardware components on one computing device, which may be a user device or a remote server. Additionally or alternatively, some or all of these steps in these methods may be performed on hardware components of different computing devices such that these methods may be performed in a distributed fashion.

At block 502, input images of a real-world material are received. Block 502 may be performed by an embodiment of digital material generator 200. Input images depict the real-world material under different lighting patterns such that each input image provides different lighting information for the same material. The different lighting patterns may include one or more area lights positioned around the real-world material. Although the material may be illuminated under different lighting patterns in the input images, the position of a camera capturing the input images may be stationary or have a fixed spatial relationship with the real-world material and lights during image capture.

In example embodiments, input images comprise sets of image, where each set is made up of at least a diffuse component image and a specular component image. The diffuse component image and the specular component image within a set are captured with the same lighting pattern. As such, rather than each image having a unique lighting pattern, each set of images for a particular material has a unique lighting pattern. For example, in an embodiment in which 24 different lighting patterns are used (such as 24 area lights arranged around the material), the input images may comprise 24 diffuse component images and 24 corresponding specular component images. The diffuse component image and specular component image may be captured by rotating a polarization filter, such as a linear polarization filter, over the lens of the camera.

Block 502 may include receiving input images directly from a camera or capture system, such as capture system 114 of FIG. 1. In other embodiments, the input images are received from a data store, such as database 112 in FIG. 1 or 240 in FIG. 2, integrated into or communicatively coupled (e.g., via a network) to a user device, such as user device 102A of FIG. 1. Input images may be received based on input from a user device. For example, a user may select the input images individually or as a set from a data store.

At block 504, one or more material map approximations are generated from the input images. Block 504 may be performed by an embodiment of material map approximation component 210 in FIG. 2. For instance, a diffuse albedo material map approximation and a normal material map approximation may be created from the input images. The material map approximations may be generated using a photometric stereo technique that utilizes a pseudo-inverse function to solve for diffuse albedo and normal vectors. In embodiments in which area lights are utilized in the lighting patterns for the input images, lighting vectors may be computed at randomly sampled points on the area light for each pixel and those lighting vectors may be summed for each area light when determining diffuse albedo and normal vectors.

At block 506, a neural network system is utilized to generate material maps for the real-world material. Block 506 may be performed by an embodiment of material maps generator 220. The material maps may be generated based on the material map approximations as well as the input images. In illustrative aspects, the material maps generated by neural network include a diffuse albedo material map, a specular albedo material map, a roughness material map, and a normal material map.

The neural network system utilized at block 506 may comprise one or more deep neural networks. An example network may be a convolutional neural network, such as a U-Net. Further, the neural network system utilized at block 506 may include a plurality of neural networks that work from the same input and that output different types of material maps. For example, the neural network system may include a diffuse albedo neural network, a specular albedo neural network, a roughness neural network, and a normal neural network. Each of these neural networks may be trained utilizing a supervised loss, such as L1.

Further, in some embodiments, lighting information for each lighting pattern represented in the input images may be input into neural network to generate the material maps. This lighting information may be in the form of an irradiance map that describes a particular lighting pattern. Each set of diffuse component image and specular component image may be input with an irradiance map representing the lighting corresponding to the set.

The material maps generated at block 506 may represent the digital material corresponding to the real-world material in the input images. The material maps may be utilized to create a visual rendering of an object with the digital material. Therefore, some embodiments of method 500 include applying the generated set of material maps to a digital object so that the digital object has the appearance of the real-world material when rendered and providing the rendered object for display on a graphic user interface. In some embodiments, the material maps are applied to a 3D shape, such as a sphere, to act as a visual sample for a library of digital materials. A user may select a set of material maps from the library, via selection of the sample digital object, for application to another object created, input, or selected by the user. In other instances, a set of maps may be generated for a particular application indicated by a user rather than for storage in a library. As such, upon generation of a set of material maps, the material maps may be automatically applied to a digital object created, input, or selected by the user.

Further, in some embodiments, method 500 includes optimizing the material maps based on a comparison of the input images and images rendered from the material maps generated at block 506. The process of optimizing the material maps in some embodiments of method 500 may be similar to block 608 in FIG. 6 described below. Where material maps are optimized, the maps may not be applied to a digital object until after optimization. The updated or optimized material maps may be applied to a digital object in the same manner described above with respect to the initially generated material maps.

Turning to FIG. 6, another method 600 for generating material maps is depicted. Method 600 includes, at block 602, receiving input images of a real-world material with different lighting patterns. Block 602 may be performed by an embodiment of digital material generator 200 and in a similar manner described with respect to block 502 of FIG. 5. As such, some embodiments of block 602 include receiving, as input images, sets of images that each comprise a diffuse component image and a specular component image.

At block 604, one or more material map approximations are generated from the input images. Block 604 may be performed by an embodiment of material map approximation component 210 in FIG. 2 and in a similar manner described with respect to block 504 of FIG. 5. In example embodiments, the one or more material map approximations include a diffuse albedo material map approximation and a normal material map material, which may be generated utilizing a photometric stereo technique to determine the albedo and normal vectors.

At block 606, a neural network system is utilized to generate an initial set of material maps for the real-world material. Block 606 may be performed by an embodiment of material maps generator 220 and in a similar manner described with respect to block 506 of FIG. 5. The material maps may be generated based on the one or more material map approximations and the input images. In some aspects, neural network system includes a plurality of neural networks that each generate a different type of material map, including a diffuse albedo material map, a specular albedo material map, a roughness material map, and a normal material map.

At block 608, an updated set of material maps is generated. This updated set is optimized based on a comparison of the input images received at block 602 and images rendered from the initial set of material maps generated at block 606. Block 608 may be performed by an embodiment of material maps optimizer 230 in FIG. 2.

Embodiments of block 608 may include first rendering a set of rendered images depicting the real-world material. These rendered images may be created from the initial set of material maps. The rendered images simulate lighting utilized for input images. As such, lighting information indicating lighting patterns used for the input images may be utilized to generate the rendered images. The rendered images are compared to the input images and, where there is a difference between the rendered images and the input images, an updated set of material maps is created to reduce or eliminate this difference. In other words, images rendered from the updated set of material maps would be closer to the input images than the images rendered from the initial set of material maps.

As the rendered images are compared to the input images, the quantity of rendered images may match the quantity of input images. Further, the rendered images may be of the same type as the input images. For example, if there are 12 input images representing 12 lighting patterns, 12 rendered images representing the same 12 lighting patterns may be generated at block 608. Additionally, in embodiments in which input images comprise sets of diffuse component images and specular component images, the rendered images may similarly include sets of diffuse component images and specular component images so that the input images and rendered images may be compared.

Block 608 may be performed utilizing a differentiable renderer. The material maps generated at block 606 may be passed through the differentiable renderer to create the rendered images, and the rendered images may be passed back through the differentiable renderer with the input images to identify differences and generate updated material maps. This process of rendering images, comparing the rendered images to the input images, and updating the material maps may be repeated until a threshold maximum difference, which may be zero, has been achieved. Alternatively or additionally, this process may be repeated for a threshold number of times. The updated material maps generated at block 608 may be stored and/or applied to a digital object in the same manner described with respect to method 500.

Methods 500 and 600 may each be utilized in initially training the neural network. When training, methods 500 and 600 may be performed by an embodiment of training engine 410 of FIG. 4. In some aspects, when methods 500 and 600 are utilized for training, the input images may be rendered from material maps derived from material graphs. The material graphs are a form of data describing a real-world material such that images rendered from material maps may be considered as depicting the real-world material even if the images are not photographs.

Figure 7:
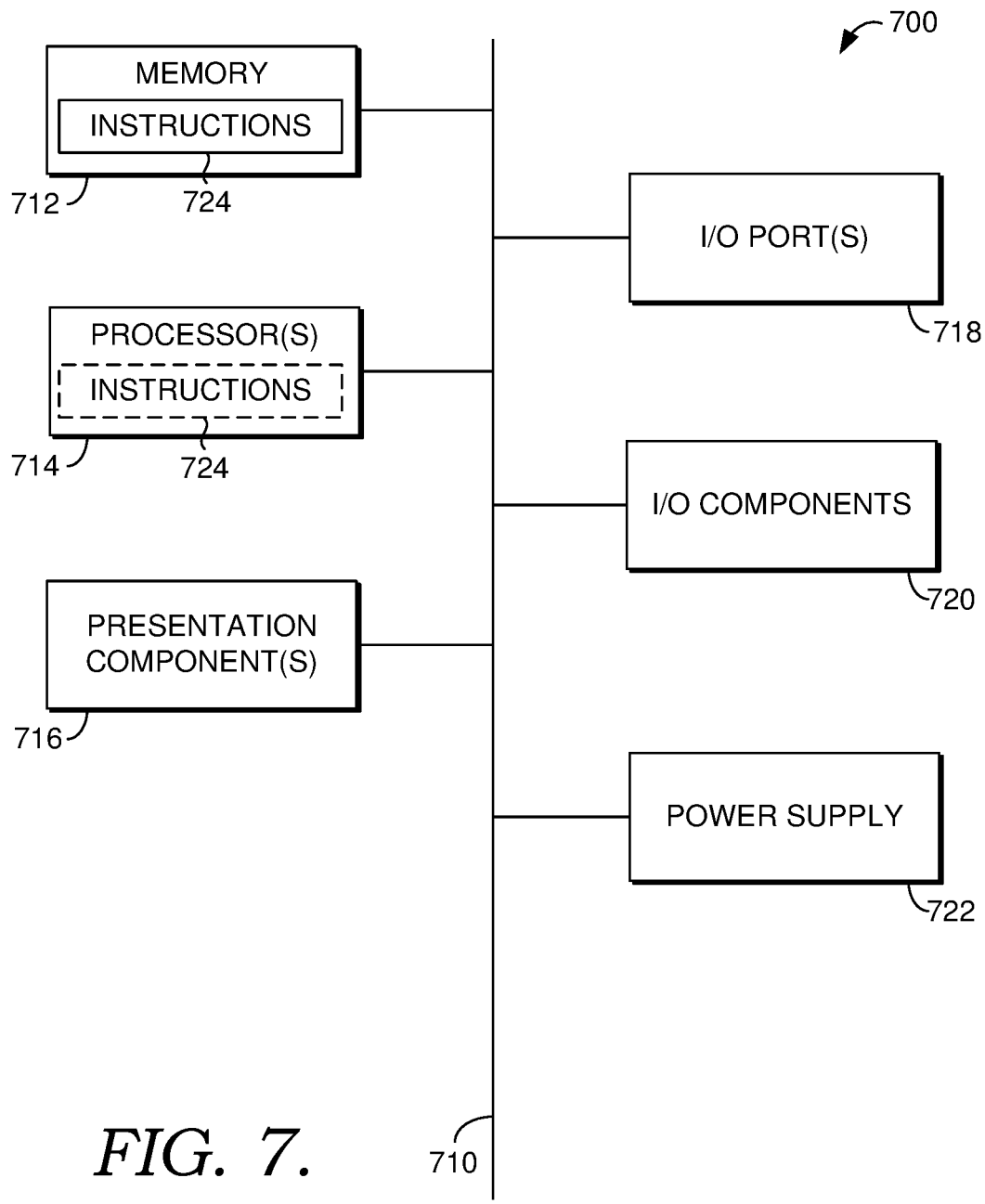
FIG. 7 is a block diagram of an example computing device in which embodiments of the present disclosure may be employed.

Having described embodiments of the present invention, FIG. 7 provides an example of a computing device in which embodiments of the present invention may be employed. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an example computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Further, a camera system integrated into and/or coupled to computing device 700 may include a polarization filter, which may be manually or automatically rotated. Additionally, computing device 700 may have integrated lighting and/or be communicatively coupled to lighting, such as a number of area light structures. Embodiments of computing device 700 may be able to control and selectively operate lighting.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. A computer-implemented method comprising:
   receiving input images depicting a real-world material, the input images comprising sets of input images, each set of input images comprising component images corresponding to a unique lighting pattern;
   from the input images, generating one or more material map approximations using a photometric stereo technique, wherein the photometric stereo technique utilizes a pseudo-inverse function, and wherein for each pixel within the input images, a lighting matrix and captured intensity are determined based on lighting vectors for light sources used in capturing the input images, the lighting matrix and captured intensity used to perform a pseudo inverse using the pseudo-inverse function;
   utilizing a neural network system to generate a set of material maps from the input images and the one or more material map approximations, the neural network system comprising a different trained neural network for each unique lighting pattern; and
   generating an updated set of material maps based on a comparison of the input images and images rendered from the set of material maps.

2. The computer-implemented method of claim 1, wherein the sets of input images comprise a diffuse component image set and a specular component image set, wherein a diffuse component image of the diffuse component image set and a specular component image of the specular component image set are each captured using a polarization filter, wherein the diffuse component image is captured when the polarization filter is at a first rotational position and the specular component image is captured when the polarization filter is at a second rotational position that has a polarization angle different from the first rotational position.

3. The computer-implemented method of claim 1, wherein each unique lighting pattern includes one or more area lights.

4. The computer-implemented method of claim 1, wherein the one or more material map approximations comprise a diffuse albedo material map approximation and a normal material map approximation.

5. The computer-implemented method of claim 1, wherein generating the updated set of material maps comprises:
rendering, from the set of material maps, a set of rendered images depicting the real-world material;
comparing the set of rendered images with the input images; and
generating the updated set of material maps to reduce errors found in the comparison of the set of rendered images and the input images.

6. The computer-implemented method of claim 1, further comprising rendering a digital object by applying the updated set of material maps to the digital object.

7. The computer-implemented method of claim 1, wherein the different trained neural network for each unique lighting pattern a diffuse albedo neural network, a normal neural network, a specular albedo neural network, and a roughness neural network, and the set of material maps comprises a diffuse albedo material map generated from the diffuse albedo neural network, a normal material map generated from the normal neural network, a specular albedo material map generated from the specular albedo neural network, and a roughness material map generated from the roughness neural network.

8. One or more computer storage media having a plurality of executable instructions embodied thereon, which, when executed by one or more processors, cause the one or more processors to perform operations comprising:
receiving input images depicting a real-world material, wherein the input images comprise sets of input images each including a diffuse component image and a specular component image, each of the diffuse component image and the specular component image corresponding to a unique lighting pattern;
from the input images, generating one or more material map approximations using a photometric stereo technique, wherein the photometric stereo technique utilizes a pseudo-inverse function, and wherein for each pixel within the input images, a lighting matrix and captured intensity are determined based on lighting vectors for light sources used in capturing the input images, the lighting matrix and captured intensity used to perform a pseudo inverse using the pseudo-inverse function; and
utilizing a neural network system to generate a set of material maps from the input images and the one or more material map approximations, the neural network system comprising a different trained neural network for each unique lighting pattern.

9. The computer storage media of claim 8, wherein the one or more material map approximations comprise a diffuse albedo material map approximation and a normal material map approximation.

10. The computer storage media of claim 8, wherein the operations further comprise rendering a digital object by applying the set of material maps to the digital object.

11. The computer storage media of claim 8, wherein the operations further comprise generating an updated set of material maps based on a comparison of the input images and images rendered from the set of material maps.

12. A computerized system comprising:
one or more processors; and
computer storage memory having computer-executable instructions stored thereon which, when executed by the one or more processors, perform operations comprising:
receiving input images depicting a real-world material with different lighting patterns, each lighting pattern including at least one area light;
from the input images, generating one or more material map approximations using a photometric stereo technique, wherein the photometric stereo technique utilizes a pseudo-inverse function, and wherein for each pixel within the input images, a lighting matrix and captured intensity are determined based on lighting vectors for light sources used in capturing the input images, the lighting matrix and captured intensity used to perform a pseudo inverse using the pseudo-inverse function; and
utilizing a neural network system to generate a set of material maps from the input images and the one or more material map approximations, the neural network system comprising a different trained neural network for each unique lighting pattern.

13. The computerized system of claim 12, wherein the input images comprise sets of input images and the sets of input images comprise a diffuse component image set and a specular component image set, wherein a diffuse component image of the diffuse component image set and a specular component image of the specular component image set are each captured using a polarization filter, wherein the diffuse component image is captured when the polarization filter is at a first rotational position and the specular component image is captured when the polarization filter is at a second rotational position that has a polarization angle different from the first rotational position.

14. The computerized system of claim 12, wherein the operations further comprise generating an updated set of material maps based on a comparison of the input images and images rendered from the set of material maps.

15. The computerized system of claim 14, wherein the updated set of material maps is generated using a differentiable renderer.

16. The computerized system of claim 12, wherein the one or more material map approximations comprise a diffuse albedo material map approximation and a normal material map approximation.

17. The computerized system of claim 12, wherein the input images comprise sets of input images, each set of input images comprising at least a diffuse component image and a specular component image, wherein the diffuse component image and the specular component image of each set are captured with a same lighting pattern.

18. The computerized system of claim 12, wherein the input images each depict the real-world material captured from a camera having a fixed position relative to the real-world material.

19. The computerized system of claim 12, further comprising rendering a digital object by applying the set of material maps to the digital object.

20. The computerized system of claim 12, wherein the different trained neural network for each unique lighting pattern comprises a diffuse albedo neural network, a normal neural network, a specular albedo neural network, and a roughness neural network, and the set of material maps comprising a diffuse albedo material map generated from the diffuse albedo neural network, a normal material map generated from the normal neural network, a specular albedo material map generated from the specular albedo neural network, and a roughness material map generated from the roughness neural network.

\* \* \* \* \*